United States Patent
Sugawara et al.

[11] Patent Number: 5,874,204
[45] Date of Patent: Feb. 23, 1999

[54] PROCESS FOR REJUVENATION TREATMENT OF PHOTORESIST DEVELOPMENT WASTE

[75] Inventors: Hiroshi Sugawara, Omiya; Hiromi Henmi, Kawagoe, both of Japan

[73] Assignee: Organo Corporation, Tokyo-to, Japan

[21] Appl. No.: 974,406

[22] Filed: Nov. 19, 1997

[30] Foreign Application Priority Data

Nov. 21, 1996 [JP] Japan .................................. 8-324867

[51] Int. Cl.$^6$ .................................................. G03C 5/31
[52] U.S. Cl. ........................................ 430/399; 430/398
[58] Field of Search ..................................... 430/398, 399

[56] References Cited

U.S. PATENT DOCUMENTS 4,186,007  1/1980  Meckl et al. ............................ 430/399

FOREIGN PATENT DOCUMENTS 57-155390   9/1982   Japan .
7-328642   12/1995   Japan .

OTHER PUBLICATIONS

Derwent abstract of 57–155390, Week 198244 B, 1997.
Derwent abstract of 7–328642, Week 199608 B, 1997.

*Primary Examiner*—Hoa Van Le
*Attorney, Agent, or Firm*—Sprung Kramer Schaefer & Briscoe

[57] ABSTRACT

The disclosed process for rejuvenation treatment of a photoresist development waste mainly containing a photoresist and tetraalkylammonium (TAA) ions comprises at least the step of concentration of TAA ions by electrodialysis and/or electrolysis, and the step of removal of impurities [(residual) photoresist, other anionic components, cationic components such as $Na^+$, etc.] by adsorption thereof on an ion exchange resin (preferably an anion exchange resin and/or a cation exchange resin in at least one of the hydrogen ion form and the TAA ion form) through contact therebetween, whereby a high-purity solution of a tetraalkylammonium hydroxide reutilizable as a photoresist developer can be simply and efficiently regenerated and recovered from the photoresist development waste. The step of concentration by evaporation and/or reverse osmosis membrane treatment may desirably be taken at least before electrodialysis and/or electrolysis from the standpoint of treatment cost reduction.

16 Claims, 5 Drawing Sheets

PROCESS FOR REJUVENATION TREATMENT OF PHOTORESIST DEVELOPMENT WASTE

BACKGROUND OF THE INVENTION

1. Field of the Invention

The present invention relates to a process for rejuvenation treatment of a photoresist development waste containing a photoresist and tetraalkylammonium ions and resulting from the process of producing electronic parts such as semiconductor devices, liquid crystal displays (LCD) and printed boards, and the like.

2. Related Art

In production of electronic parts such as semiconductor devices, liquid crystal displays and printed boards, and the like, a film of a negative or positive photoresist is formed on a substrate such as a wafer, then irradiated with a light or the like through a pattern mask, subsequently developed with a developer through dissolution therein of unnecessary part of the photoresist, and further subjected to etching or the like treatment, followed by removal of the insoluble photoresist film remaining on the substrate. Photoresists include positive photoresists which turn soluble where exposed to a light, and negative photoresists which turn insoluble where exposed to a light. The mainstream developer for the positive photoresists is an alkali developer. Although the mainstream developer for the negative photoresists is an organic solvent developer, an alkali developer is used for some negative photoresists.

An aqueous solution of a tetraalkylammonium hydroxide is usually used as an alkali developer as mentioned above. Thus, the dissolved photoresist and tetraalkylammonium ions are usually contained in a waste discharged from the process of development (called "photoresist development waste" or "photoresist alkali development waste"). Herein, although the counter ions of tetraalkylammonium ions are usually hydroxide ions (OH⁻) as is apparent from the foregoing, other ions may be some of the counter ions to form a salt(s) because such a waste (waste water), which differs from factory to factory, may be mixed with any foreign matter or may possibly be mixed with other waste water in some cases. Accordingly, the counter ions are not specified and the expression is instead made under the idea of "ions" in the generic description of the instant specification. Since tetraalkylammonium ions in the waste usually exist in the form of a tetraalkylammonium hydroxide as described above, however, the present invention will be described with priority given thereto.

Conventional methods of treating a photoresist development waste containing a photoresist and tetraalkylammonium ions include a method wherein all the waste is entrusted to a contractor for off-site disposal thereof, a method wherein the waste is concentrated by evaporation or reverse osmosis, followed by disposal (incineration or off-site disposal by contractor), and a method wherein the waste is subjected to a biodegradation treatment with activated sludge, and then discharged. Besides, in the case of a waste concentrated in the above-mentioned manner or a thick waste having a high tetraalkylammonium ion concentration from the beginning, there have been made attempts to concentrate, recover and reutilize tetraalkylammonium ions preferably in the hydroxide form by electrodialysis or electrolysis (naturally recovered in the hydroxide form by electrolysis).

The method comprising evaporation or reverse osmosis for concentration involves concentration of the alkali-soluble photoresist as well as tetraalkylammonium ions, with the result that the resulting liquid waste must inevitably be disposed of. The method comprising a biodegradation treatment with activated sludge is only capable of treating a low-concentration waste while requiring large-scale treatment facilities because the biodegradability of tetraalkylammonium ions is poor and proliferation of microorganisms capable of degrading other organic components, if mixed in the waste, becomes rather active while inactivating proliferation of microorganisms capable of degrading tetraalkylammonium ions to further deteriorate the biodegradability thereof. On the other hand, the method of recovering tetraalkylammonium ions preferably in the hydroxide form through concentration thereof by electrodialysis or electrolysis (naturally recovered in the hydroxide form by electrolysis), though best in aspects of a countermeasure against pollution, efficient utilization of resources, etc., involves a problem that a slight amount of impurities such as the photoresist and cations including $Na^+$, $K^+$ and $Ca^{2+}$ ($Na^+$ in particular) remains in the resulting recovered solution though a high purity of the solution is required for reutilization thereof as a photoresist alkali developer for use in production of, for example, electronic parts such as semiconductor devices, liquid crystal displays and printed boards.

Accordingly, an object of the present invention is to provide a simple and effective process for rejuvenation treatment of a photoresist development waste with elimination of the forgoing drawbacks of the conventional methods of treating a photoresist development waste containing a photoresist and tetraalkylammonium ions.

SUMMARY OF THE INVENTION

According to the present invention, there is provided a process for rejuvenation treatment of a photoresist development waste mainly containing a photoresist and tetraalkylammonium ions for regeneration and recovery of a high-purity solution of a tetraalkylammonium hydroxide reutilizable as a photoresist developer from the photoresist development waste, comprising at least the step of concentration of tetraalkylammonium ions by electrodialysis and/or electrolysis, and the step of removal of impurities by adsorption thereof on an ion exchange resin [an anion exchange resin and/or a cation exchange resin] through contact therebetween (various embodiments can be adopted in connection with the order of these steps as will be described later).

Although the treatment may be simple when the photoresist development waste containing the photoresist and tetraalkylammonium ions (hereinafter often referred to in brief as the "development waste") is directly subjected to the step of concentration by electrodialysis and/or electrolysis and the step of removal of impurities by adsorption thereof on the ion exchange resin through contact therebetween, there is a case where it is preferred particularly in an aspect of the ion exchange capacity of an anion exchange resin, if any, that the development waste or its concentrate (concentrate obtained by evaporation and/or reverse osmosis membrane treatment as will be described later), before subjected to these steps, be preliminarily neutralized and then stripped of some of the photoresist by solid-liquid separation, if necessary, to obtain a neutralized and solid-removed solution decreased in the amount of the photoresist, followed by taking the above-mentioned steps. In this case, however, the electrolysis step is usually required to turn tetraalkylammonium ions into the hydroxide (OH) form.

Additionally stated, the development waste containing the tetraalkylammonium hydroxide and the photoresist is usually alkaline with a pH of 12 to 14, and the photoresist is dissolved in the alkaline solution. The present invention is applicable to this kind of alkaline development waste as it is. Since the alkali-soluble photoresist, which has carboxyl groups and/or the like, is dissolved in a developer during the course of development by which such groups are converted into such groups as to form a tetraalkylammonium salt, neutralization of the development waste to a pH of at most 10, preferably at most 8 (neutralization to the acidic side is also feasible), convert these groups again into the carboxyl groups and/or the like to make most of the photoresist insoluble, whereby most of the photoresist can be removed by a solid-liquid separation method such as centrifugalization or filtration. The treated solution thus obtained by neutralizing the development waste and then removing therefrom some of the photoresist by a solid-liquid separation method such as centrifugalization or filtration is referred to as the "neutralized and solid-removed solution" in the instant specification.

When the photoresist development waste is first treated by at least one of electrodialysis and electrolysis, a concentrate having tetraalkylammonium ions (counter ions are mainly hydroxide ions) concentrated therein can be recovered. Although most of the photoresist is left in the desalted solution ("dilute solution" decreased in the amount of tetraalkylammonium ions) by means of an ion exchange membrane(s) [as will be described later, neutral membranes may be used instead of anion exchange membranes in the case of electrodialysis, and 2 neutral membranes may be used instead of a cation exchange membrane in the case of electrolysis], a little photoresist remains or is mixed in the recovered concentrate. Further, cations such as $Na^+$, $K^+$ and $Ca^{2+}$ (for example, $Na^+$ is sometimes contained in an amount of at most 10 ppb in a tetramethylammonium hydroxide product as a developer, and in an amount of at least 100 ppb in some development waste after service thereof) as well as anions such as $Cl^-$, $NO_3^-$, $SO_4^{2-}$, $HCO_3^-$ and $CO_3^{2-}$ are transferred together with tetraalkylammonium ions to the recovered concentrate (in electrolysis, however, migration of anions is very little). Accordingly, the recovered tetraalkylammonium ion concentrate contains a small amount of the photoresist and ionic components as impurities.

When the recovered concentrate is brought into contact with an anion exchange resin, preferably a strongly basic anion exchange resin (preferably in the OH form), the photoresist and anionic components as impurities are removed therefrom, but the cationic components are not removed to remain therein. Additionally stated, when the anion exchange resin is in the OH form, tetraalkylammonium ions advantageously become present in the form of a tetraalkylammonium hydroxide in the anion-exchanged concentrate.

In view of the above, when the concentrate is also brought into contact with a cation exchange resin, the cationic components as impurities are adsorbed on the cation exchange resin to be removed as well, whereby a solution of the tetraalkylammonium hydroxide can be obtained, which is highly refined to such an extent that it is well reutilizable even as a photoresist alkali developer for use in production of electronic parts such as semiconductor devices, liquid crystal displays and printed boards.

Which one of an anion exchange resin and a cation exchange resin, or both to use as the ion exchange resin may be determined based on the permissible amounts of various impurities such as the photoresist, anions and cations that may be left in a solution of the tetraalkylammonium hydroxide to be rejuvenated in connection with a use of that solution. In the case where the rejuvenated solution of the tetraalkylammonium hydroxide is used as a developer for use in production of, for example, electronic parts such as semiconductor devices, liquid crystal displays and printed boards as described above, however, both of the anion exchange resin and the cation exchange resin are desirably used.

Although there may be adopted a method comprising contact with the ion exchange resin and subsequent electrodialysis and/or electrolysis, a method comprising electrodialysis and/or electrolysis and subsequent contact with the ion exchange resin is preferred particularly from the standpoint of the ion exchange capacity of the anion exchange resin.

Anion exchange resins preferred in an aspect of treatment efficiency include styrene, acrylic or like type anion exchange resins in a fibrous, granular or like form, which may be used either alone or in the form of a mixture or a stratified structure of a plurality thereof at an arbitrary proportion. As will be described later, however, styrene type anion exchange resins are especially preferred. Additionally stated, acrylic type anion exchange resins are those obtained by crosslinking (meth)acrylic acid and an ester(s) thereof with divinylbenzene (DVB) or the like. Strongly basic anion exchange resins are preferred in an aspect of the photoresist removal efficiency, but weakly basic anion exchange resins also exert a photoresist- removing effect particularly on the neutral or acidic side. Thus, a plurality of strongly and weakly basic anion exchange resins may also be used in the form of either a mixture or a stratified structure at an arbitrary proportion. Although the counter ions of an anion exchange resin may be either $OH^-$, or $Cl^-$ or the like, use of an anion exchange resin in the OH form, which has $OH^-$ ions as the counter ions, is preferred. This is so because use of an anion exchange resin in the Cl or like form, which has $Cl^-$ or like ions as the counter ions, results in conversion of at least part of the counter ions of tetraalkylammonium ions into $Cl^-$ or like ions. Additionally stated, when a weakly basic anion exchange resin is used on the neutral or acidic side, or when an anion exchange resin in the Cl or like form, which has $Cl^-$ or like ions as the counter ions, is used, electrolysis in a later step will suffice in order to turn tetraalkylammonium ions into the form of a tetraalkylammonium hydroxide.

Cation exchange resins preferred in an aspect of treatment efficiency include styrene or acrylic type cation exchange resins in a fibrous, granular or like form, which may be used either alone or in the form of a mixture or a stratified structure of a plurality thereof at an arbitrary proportion. Use may be made of either a weakly acidic cation exchange resin or a strongly acidic cation exchange resin, or both in the form of a mixture or a stratified structure at an arbitrary proportion.

Commercially available cation exchange resins are usually in the hydrogen ion form (H form) or in the sodium ion form (Na form). Such a cation exchange resin (preferably in the H form) may preliminarily be turned into the tetraalkylammonium ion form (TAA form) before service thereof to prevent occurrence of a phenomenon that the tetraalkylammonium hydroxide is adsorbed on the cation exchange resin in the initial stage of solution passage through the cation exchange resin to lower the tetraalkylammonium hydroxide concentration of the resulting treated solution. More specifically, use of a cation exchange resin, after being turned into the tetraalkylammonium ion form (TAA form), is preferred though it can be used in the H form as it is.

However, the cation exchange resin not completely in the TAA form but partially in the H form may also be used, or both of a cation exchange resin in the H form and a cation exchange resin in the TAA form may further alternatively be used in the form of either a mixture or a stratified structure at an arbitrary proportion.

Needless to say, use of the ion exchange resin (anion exchange resin and/or cation exchange resin) well washed with ultrapure water is preferred in order to make the ion exchange resin free from any matter that may be leached out therefrom during the course of service of the ion exchange resin.

When both of an anion exchange resin and an cation exchange resin are used as the ion exchange resin, the anion exchange resin and the cation exchange resin may be mixed with each other and used in the form of a mixed ion exchange resin packed in a column or a tower, but are preferably used in the form of a stratified structure packed in a column or a tower, wherein the anion exchange resin is disposed on the upstream side of the cation exchange resin disposed on the downstream side. When the photoresist development waste is preliminarily subjected to a multi-stage electrodialysis treatment or the like to make the concentrate slight in the amount of the photoresist, or when the original photoresist development waste contains only a slight amount of the photoresist, however, the cation exchange resin may be disposed on the upstream side of the anion exchange resin disposed on the downstream side. Further, an upstream column or tower packed with the anion exchange resin may be disposed separately from but used in connection with a downstream column or tower packed with the cation exchange resin. In this case, only one of the anion and cation exchange resins, when decreased in ion exchange capacity or deteriorated through long-time service, can conveniently be easily replaced with the virgin one. In the foregoing cases, one of the column or tower packed with the anion exchange resin and the column or tower packed with the cation exchange resin may be provided before an electrodialysis unit and/or an electrolysis unit.

Advantages involved in the case where the anion exchange resin is disposed on the upstream side of the cation exchange resin disposed on the downstream side are as follows: Since it is conceivable that a trace amount of an amine may be leached out from the anion exchange resin, this leached-out amine, if any, can be trapped on the cation exchange resin disposed on the downstream side. Further, since the photoresist as a polymeric substance has a fear of being adsorbed on the surfaces of the cation exchange resin to lower the cation exchange activity of the resin, the photoresist can advantageously be sufficiently removed beforehand by the anion exchange resin disposed on the upstream side.

An additional step of evaporation and/or reverse osmosis membrane treatment for concentration of the photoresist development waste or its treated solution (neutralized and solid-removed and/or ion-exchanged solution) may desirably be taken at least before the electrodialysis and/or electrolysis step. When the neutralization and solid-liquid separation step and/or the ion exchange treatment step is taken, this evaporation and/or reverse osmosis membrane treatment step may be taken at any stage, e.g., at first, later or between both.

Advantages of taking this evaporation and/or reverse osmosis membrane treatment step include an improvement in current efficiency during electrodialysis and/or electrolysis, miniaturization and running cost reduction of an electrodialysis unit and/or an electrolysis unit due to a decrease in the amount of the solution to be treated therewith, lowering of a voltage to be applied to such a unit(s), and an improvement in tetraalkylammonium ion recovery.

As described hereinbefore, evaporation and reverse osmosis membrane treatment both involve concentration of impurities such as the photoresist in the resulting concentrate. However, this is not particularly the problem because the concentrated impurities are removed at least by electrodialysis and/or electrolysis (and desirably by ion exchange treatment at least after the evaporation and/or the reverse osmosis membrane treatment).

Additionally stated, either condensed water obtained by evaporation or permeate water obtained by reverse osmosis membrane treatment does not substantially contain the photoresist and tetraalkylammonium ions to be able to serve as process water or the like. In passing, in the case of reverse osmosis membrane treatment, the solution to be treated thereby preferably has a pH value of 9 to 12 from the standpoint of minimizing the deterioration of a reverse osmosis membrane.

In comparison of evaporation with reverse osmosis membrane treatment, the former is high in running cost but advantageous in that the concentration rate can easily be heightened, while the latter is advantageously low in running cost but has a limit in respect of concentration rate and requires a large-scale high-pressure pump for a positive increase in the concentration rate, whereby the practical upper limit of the tetraalkylammonium ion concentration of the concentrate is to a degree of about several percents. Accordingly, which to choose between evaporation and reverse osmosis membrane treatment, or to adopt a combination thereof may be judged from the properties of the photoresist development waste such as the tetraalkylammonium ion concentration thereof.

A membrane treatment unit may further be provided at or near the terminal of the system involved in the process. In this case, fine particles that exist in the development waste from the beginning, and fine particles that may be mixed therein from an electrodialysis unit and/or an electrolysis unit, pumps, the ion exchange resin, etc. can favorably be removed for certain.

Examples of the membrane treatment unit include a membrane treatment unit wherein use is made of a polypropylene (PP) or polytetrafluoroethylene (PTFE) membrane filter having micropores of 0.03 to 1 $\mu$m in diameter, and an ultrafiltration membrane unit. A suitable membrane treatment unit may be chosen and used in accordance with the purpose.

The resulting treated solution as a high-purity solution of the tetraalkylammonium hydroxide may further be concentrated by a method such as electrodialysis, electrolysis, evaporation, reverse osmosis, or a combination thereof. When the treatment with the aforementioned membrane treatment unit for the removal of fine particles is done in this case, any order of treatment operations may be chosen, but the treatment with the membrane treatment unit is preferably done in the last stage in view of the fact that the treatment with the membrane treatment unit is aimed at removing fine particles.

In concentrating tetraalkylammonium ions by electrodialysis and/or electrolysis, irrespective of either before or after contact with the ion exchange resin, at least one of electrodialysis and electrolysis may be effected according to either a circulation method or a multi-stage treatment method, whereby the concentration and purity of the tetraalkylammonium ion concentrate can be heightened.

Tetraalkylammonium ions in the photoresist alkali development waste are derived from a tetraalkylammonium hydroxide, used as the alkali in the photoresist developer for use in production of various electronic parts and the like, examples of which include tetramethylammonium hydroxide, tetraethylammonium hydroxide, tetrapropylammonium hydroxide, tetrabutylammonium hydroxide, methyltriethylammonium hydroxide, trimethylethylammonium hydroxide, dimethyldiethylammonium hydroxide, trimethyl(2-hydroxyethyl)ammonium hydroxide, triethyl(2-hydroxyethyl)ammonium hydroxide, dimethyldi(2-hydroxyethyl)ammonium hydroxide, diethyldi(2-hydroxyethyl)ammonium hydroxide, methyltri(2-hydroxyethyl)ammonium hydroxide, ethyltri(2-hydroxyethyl)ammonium hydroxide, and tetra(2-hydroxyethyl)ammonium hydroxide (the former two in particular).

The counter ions of the tetraalkylammonium ions in the development waste are usually hydroxide ions (OH⁻) as described above. In some factory and/or in the case where neutralization is done, however, the counter ions of the tetraalkylammonium ions may generally be at least one kind of ions selected from among inorganic anions such as fluoride ions, chloride ions, bromide ions, carbonate ions, hydrogencarbonate ions, sulfate ions, hydrogensulfate ions, nitrate ions, phosphate ions, hydrogenphosphate ions and dihydrogenphosphate ions, and organic anions such as formate ions, acetate ions, and oxalate ions. Carbonate ions and hydrogencarbonate ions in particular may often exist in a small amount because carbon dioxide gas in the air is liable to be dissolved in the development waste. Additionally stated, since the counter ions of the tetraalkylammonium ions in the concentrate obtained through electrolysis are usually hydroxide ions, incorporation of at least an electrolysis step into the process of the present invention will suffice when the amount of the above-mentioned kind(s) of counter ions other than hydroxide ions is so large that a difficulty is encountered in reutilizing the resulting solution of the tetraalkylammonium hydroxide as a photoresist alkali developer.

The photoresist is dissolved as an anionic polymer in an ordinary photoresist development waste due to its carboxyl groups and/or the like, while the tetraalkylammonium hydroxide is dissociated into tetraalkylammonium ions as cations and hydroxide ions as anions.

When such a waste is brought into contact with the anion exchange resin, the photoresist can be adsorbed on the anion exchange resin, whereby the photoresist can be removed from the waste.

The mainstream alkali-developable photoresists are those having a novolak resin as the matrix resin. This novolak resin has a large number of benzene rings. When a styrene type anion exchange resin having benzene rings or the like resin in particular is used as the anion exchange resin, it is believed that the photoresist can be highly selectively removed due to affinity (hydrophobic) interaction between the respective benzene rings of the anion exchange resin and the photoresist in addition to the mutual electrostatic interaction thereof.

Thus, it is believed that the photoresist even in a concentrate having the tetraalkylammonium hydroxide concentration heightened by electrodialysis and/or electrolysis can be effectively and selectively adsorbed on and removed by the anion exchange resin as mentioned above despite the coexistence of a large amount of competitive hydroxide ions (derived from the tetraalkylammonium hydroxide).

More specifically, the solution of the tetraalkylammonium hydroxide (concentrate) recovered by electrodialysis and/or electrolysis, though comparatively high in the tetraalkylammonium hydroxide concentration, can be stripped of a minute amount of the residual photoresist (and other anionic impurities) when brought into contact with the anion exchange resin, and may desirably be stripped of cationic impurities when also brought into contact with the cation exchange resin, whereby the resulting treated solution can be reutilized as a high-purity rejuvenated developer.

When the photoresist development waste is brought into contact with the anion exchange resin as mentioned above before concentration thereof by electrodialysis and/or electrolysis, the photoresist can easily be removed therefrom because of the low tetraalkylammonium hydroxide concentration of the development waste. In this case, therefore, a solution of the tetraalkylammonium hydroxide not substantially containing the photoresist is concentrated by electrodialysis and/or electrolysis, and may desirably be stripped of cationic impurities when also brought into contact with the cation exchange resin, whereby the resulting treated solution can be reutilized as a high-purity rejuvenated developer.

In the case of a development waste having a high photoresist concentration, it is advantageous from the standpoint of the ion exchange capacity of the anion exchange resin that it is neutralized in a pretreatment to insolubilize the photoresist, which is then separated and removed by a solid-liquid separation method such as centrifugalization or filtration, and that the resulting neutralized and solid-removed solution is subsequently brought into contact with the anion exchange resin as mentioned above to adsorb the remaining photoresist on the anion exchange resin for removal thereof. Through such neutralization, however, at least part of the tetraalkylammonium hydroxide becomes a tetraalkylammonium salt. Thus, when the resulting solution containing the tetraalkylammonium salt (neutralized and solid-removed solution) is concentrated by electrodialysis and/or electrolysis, a high-purity solution of the tetraalkylammonium salt (in the case of electrodialysis) or the tetraalkylammonium hydroxide (in the case of electrolysis) can be recovered. The solution, either as it is in the case of electrolysis, or after it is further subjected, in the case of electrodialysis, to electrolysis to regenerate the tetraalkylammonium hydroxide, may desirably be stripped of cationic impurities also by bringing it into contact with the cation exchange resin, whereby the resulting treated solution can be reutilized as a high-purity rejuvenated developer.

BRIEF DESCRIPTION OF THE DRAWINGS

The foregoing objects, features and advantages of the present invention will be better understood from the following description taken in connection with the accompanying drawings, in which.

PREFERRED MODES FOR CARRYING OUT THE INVENTION

Modes for carrying out the present invention as described hereinbefore include the following preferred embodiments. However, these embodiments should not be construed as limiting the scope of the present invention.

(1) A process for rejuvenation treatment of a photoresist development waste, comprising the step of subjecting a photoresist development waste mainly containing a photoresist and tetraalkylammonium ions to at least one of electrodialysis and electrolysis; and the step of bringing the concentrate obtained through the above-mentioned step and mainly containing tetraalkylammonium ions into contact with an anion exchange resin and a cation exchange resin in at least one of the H form and the TAA form to adsorb impurities thereon for removal of the impurities; whereby a high-purity solution of a tetraalkylammonium hydroxide reutilizable as a photoresist developer is regenerated and recovered.

(2) A process for rejuvenation treatment of a photoresist development waste, comprising the step of bringing a photoresist development waste mainly containing a photoresist and tetraalkylammonium ions into contact with an anion exchange resin and a cation exchange resin in at least one of the H form and the TAA form to adsorb impurities thereon for removal of the impurities; and the step of subjecting the treated solution obtained through the above-mentioned step to at least one of electrodialysis and electrolysis to concentrate the tetraalkylammonium ions and separate the resulting concentrate; whereby a high-purity solution of a tetraalkylammonium hydroxide reutilizable as a photoresist developer is regenerated and recovered.

(3) A process for rejuvenation treatment of a photoresist development waste, comprising the step of bringing a photoresist development waste mainly containing a photoresist and tetraalkylammonium ions into contact with an anion exchange resin to mainly adsorb the photoresist as an impurity on the anion exchange resin for removal thereof; the step of subjecting the treated solution obtained through the above-mentioned step to at least one of electrodialysis and electrolysis to concentrate the tetraalkylammonium ions and separate the resulting concentrate; and the step of bringing the concentrate obtained through the above-mentioned two steps and mainly containing the tetraalkylammonium ions into contact with a cation exchange resin in at least one of the H form and the TAA form to further adsorb impurities on the cation exchange resin for removal of the impurities; whereby a high-purity solution of a tetraalkylammonium hydroxide reutilizable as a photoresist developer is regenerated and recovered.

(4) A process for rejuvenation treatment of a photoresist development waste, comprising the step of neutralizing a photoresist development waste mainly containing a photoresist and tetraalkylammonium ions, and separating and removing therefrom the insolubilized photoresist; the step of subjecting the neutralized and solid-removed solution obtained through the above-mentioned step to electrodialysis and electrolysis, or electrolysis to concentrate the tetraalkylammonium ions and separate the resulting concentrate; and the step of bringing the concentrate obtained through the above-mentioned two steps and mainly containing the tetraalkylammonium ions into contact with an anion exchange resin and a cation exchange resin in at least one of the H form and the TAA form to adsorb impurities thereon for removal of the impurities; whereby a high-purity solution of a tetraalkylammonium hydroxide reutilizable as a photoresist developer is regenerated and recovered.

(5) A process for rejuvenation treatment of a photoresist development waste, comprising the step of neutralizing a photoresist development waste mainly containing a photoresist and tetraalkylammonium ions, and separating and removing therefrom the insolubilized photoresist; the step of bringing the neutralized and solid-removed solution obtained through the above-mentioned step into contact with an anion exchange resin and a cation exchange resin in at least one of the H form and the TAA form to adsorb impurities thereon for removal of the impurities; and the step of subjecting the treated solution obtained through the above-mentioned two steps to electrodialysis and electrolysis, or electrolysis to concentrate the tetraalkylammonium ions and separate the resulting concentrate; whereby a high-purity solution of a tetraalkylammonium hydroxide reutilizable as a photoresist developer is regenerated and recovered.

(6) A process for rejuvenation treatment of a photoresist development waste, comprising the step of neutralizing a photoresist development waste mainly containing a photoresist and tetraalkylammonium ions, and separating and removing therefrom the insolubilized photoresist; the step of bringing the neutralized and solid-removed solution obtained through the above-mentioned step into contact with an anion exchange resin to mainly adsorb the residual photoresist as an impurity on the anion exchange resin for removal thereof; the step of subjecting the treated solution obtained through the above-mentioned two steps to electrodialysis and electrolysis, or electrolysis to concentrate the tetraalkylammonium ions and separate the resulting concentrate; and the step of bringing the treated solution obtained through the above-mentioned three steps and mainly containing the tetraalkylammonium ions into contact with a cation exchange resin in at least one of the H form and the TAA form to further adsorb impurities on the cation exchange resin for removal of the impurities; whereby a high-purity solution of a tetraalkylammonium hydroxide reutilizable as a photoresist developer is regenerated and recovered.

In the foregoing processes (1) to (6), a membrane treatment is desirably effected in or near the last stage as already described. The foregoing processes (1) to (6) preferably further comprise the step of evaporation and/or reverse osmosis membrane treatment of the photoresist development waste or its treated solution (neutralized and solid-removed, and/or ion-exchanged solution) to effect concentration thereof at least before the electrodialysis and/or electrolysis step as already described. Examples of the preferred order (flow) of a series of unit operations in this case are as follows, but should not be construed as limiting the scope of the present invention. Additionally stated, the indication "(membrane treatment)" in the following examples is intended to indicate that the membrane treatment is desirably effected, but is not an indispensable unit operation.

(1) evaporation/reverse osmosis membrane treatment→electrodialysis/electrolysis→ion exchange treatment (mixed bed of anion exchange resin+cation exchange resin, hereinafter referred to simply as "mixed bed")→(membrane treatment).

(2) evaporation/reverse osmosis membrane treatment→electrodialysis/electrolysis→anion exchange treatment→cation exchange treatment→(membrane treatment).

(3) neutralization+solid-liquid separation→evaporation/reverse osmosis membrane treatment→electrolysis→ion exchange treatment (mixed bed)→(membrane treatment).

(4) neutralization+solid-liquid separation→evaporation/reverse osmosis membrane treatment→electrolysis→cation exchange treatment→(membrane treatment).

(5) neutralization+solid-liquid separation→evaporation/reverse osmosis membrane treatment→electrolysis→anion exchange treatment→cation exchange treatment→(membrane treatment).

(6) anion exchange treatment→evaporation/reverse osmosis membrane treatment→electrodialysis/electrolysis→ion exchange treatment (mixed bed)→(membrane treatment).

(7) anion exchange treatment→evaporation/reverse osmosis membrane treatment→electrodialysis/electrolysis→cation exchange treatment→(membrane treatment).

(8) anion exchange treatment→evaporation/reverse osmosis membrane treatment→electrodialysis/electrolysis→anion exchange treatment→cation exchange treatment→(membrane treatment).

(9) evaporation/reverse osmosis membrane treatment→anion exchange treatment→electrodialysis/electrolysis→ion exchange treatment (mixed bed)→(membrane treatment).

(10) evaporation/reverse osmosis membrane treatment→anion exchange treatment→electrodialysis/electrolysis→cation exchange treatment→(membrane treatment).

(11) evaporation/reverse osmosis membrane treatment→anion exchange treatment→electrodialysis/electrolysis→anion exchange treatment→cation exchange treatment→(membrane treatment).

(12) neutralization+solid-liquid separation→anion exchange treatment→evaporation/reverse osmosis membrane treatment→electrolysis→ion exchange treatment (mixed bed)→(membrane treatment).

(13) neutralization+solid-liquid separation→anion exchange treatment→evaporation/reverse osmosis membrane treatment→electrolysis→cation exchange treatment→(membrane treatment).

(14) neutralization+solid-liquid separation→anion exchange treatment→evaporation/reverse osmosis membrane treatment→electrolysis→anion exchange treatment→cation exchange treatment→(membrane treatment).

(15) neutralization+solid-liquid separation→evaporation/reverse osmosis membrane treatment→anion exchange treatment→electrolysis→ion exchange treatment (mixed bed)→(membrane treatment).

(16) neutralization+solid-liquid separation→evaporation/reverse osmosis membrane treatment→anion exchange treatment→electrolysis→cation exchange treatment→(membrane treatment).

(17) neutralization+solid-liquid separation→evaporation/reverse osmosis membrane treatment→anion exchange treatment→electrolysis→anion exchange treatment→cation exchange treatment→(membrane treatment).

(18) evaporation/reverse osmosis membrane treatment→neutralization+solid-liquid separation→anion exchange treatment→electrolysis→ion exchange treatment (mixed bed)→(membrane treatment).

(19) evaporation/reverse osmosis membrane treatment→neutralization+solid-liquid separation→anion exchange treatment→electrolysis→cation exchange treatment→(membrane treatment).

(20) evaporation/reverse osmosis membrane treatment→neutralization+solid-liquid separation→anion exchange treatment→electrolysis→anion exchange treatment→cation exchange treatment→(membrane treatment).

(21) evaporation/reverse osmosis membrane treatment→neutralization+solid-liquid separation→electrolysis→ion exchange treatment (mixed bed)→(membrane treatment).

(22) evaporation/reverse osmosis membrane treatment→neutralization+solid-liquid separation→electrolysis→anion exchange treatment→cation exchange treatment→(membrane treatment).

A more specific description will be made of an example of a case where a development waste is rejuvenated and reutilized as a photoresist developer according to an embodiment of the present invention wherein electrodialysis is used. An aqueous solution of tetramethylammonium hydroxide (hereinafter referred to in brief as "TMAH") having a concentration of 2.38 wt. % is most generally used as a photoresist developer. When a photoresist is developed with this developer, the development waste containing the photoresist and TMAH is usually generated. This development waste, its treated solution or its concentrate obtained by evaporation or reverse osmosis membrane treatment thereof is concentrated by electrodialysis to obtain a TMAH concentrate. This concentrate is brought into contact with an anion exchange resin to adsorb the photoresist remaining in the concentrate on the anion exchange resin for removal thereof, and, if necessary, is further subjected to electrodialysis (and/or electrolysis) to concentrate the resulting treated solution. In this case, metal cations such as $Na^+$, $K^+$, $Ca^{2+}$, $Fe^{2+}$, $Fe^{3+}$, $Cu^{2+}$ and $Al^{3+}$ are usually contained in the development waste because they are mixed therein from chemicals and dissolved therein from piping materials and the like. These metal cations are not removed by electrodialysis but concentrated the other way around. Accordingly, if the resulting concentrate is used intact as a rejuvenated developer, the metal cations may sometimes exert an adverse effect in the course of production of electronic parts. Thus, the concentrate is further treated with a cation exchange resin in at least one of the H form and the TAA form [tetramethylammonium (TMA) form in this case].

In this embodiment, instead of concentration to an aqueous solution having a TMAH concentration of 2.38 wt. %, concentration may be effected in such a way as to obtain an aqueous solution having a TMAH concentration of, e.g., about 1 wt. %, which is then adjusted to a TMAH concentration of 2.38 wt. % with a commercially available conc. aqueous solution having a TMAH concentration of, e.g., about 20 wt. %, thereby obtaining a reusable photoresist developer. This may be favorable because the concentration of the above-mentioned metal cations as impurities can sometimes be controlled to a lower level. When use is made of a concentrate obtained by a pretreatment such as evaporation or reverse osmosis membrane treatment of the development waste, a recovered developer having a TMAH concentration exceeding 2.38 wt. % may be easily obtained the other way around, which may be then diluted with ultrapure water to be used as a rejuvenated developer. This also may be favorable because the concentration of the above-mentioned metal cations as impurities can sometimes be controlled to a lower level.

The principle of electrodialysis that may be effected in the process of the present invention for treatment of a development waste will now be described while referring to FIG. 1. Incidentally, the description will be made of an ordinary case where tetraalkylammonium ions (hereinafter referred to in brief as "TAA ions") have hydroxide ions (OH$^-$, hereinafter referred to in brief as "OH ions") as the counter ions to be in the form of a tetraalkylammonium hydroxide (hereinafter referred to in brief as "TAAH").

Figure 1:
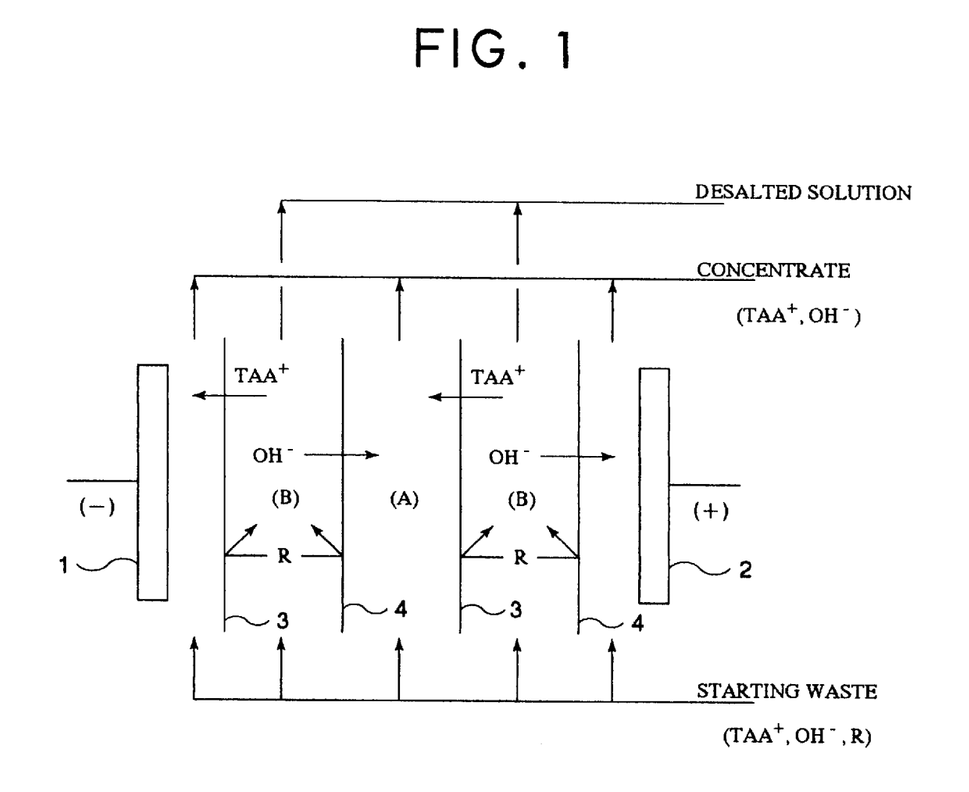
FIG. 1 is an illustration showing the principle of electrodialysis when electrodialysis is carried out in the process of the present invention.

As shown in FIG. 1, cation exchange membranes 3 and anion exchange membranes 4 are arrayed alternately with each other between a cathode 1 and an anode 2 to form a plurality of cells. TAAH in a starting waste (development waste or its treated solution obtained through evaporation and/or reverse osmosis membrane treatment and/or ion exchange resin treatment thereof) containing TAAH and a photoresist (R), and sent to the cells is dissociated into TAA ions (TAA$^+$) as cations and OH ions as anions. When a DC electric current is applied between the cathode 1 and the anode 2, therefore, TAA ions are transferred toward the cathode across a cation exchange membrane 3 but substantially blocked by an anion exchange membrane 4 next thereto, while OH ions are transferred toward the anode across an anion exchange membranes 4 but substantially blocked by a cation exchange membrane 3 next thereto. Thus, TAAH is concentrated in a given cell, while TAAH is depleted in cells adjacent to that cell. More specifically, a cell (A) having an anion exchange membrane 4 facing the cathode 1 functions as a concentrating cell wherein TAAH is concentrated to form a concentrate, while a cell (B) having an anion exchange membrane 4 facing the anode 2 functions as a desalting cell wherein TAAH is depleted to form a desalted solution. Since the photoresist (R) in the starting waste hardly moves across the ion exchange membranes, the photoresist (R) is passed as such through every concentrating cell and every desalting cell to remain in the concentrate and the desalted solution.

As is apparent from the foregoing description, when the starting waste is passed through both the desalting cells and the concentrating cells as shown in FIG. 1, the photoresist (R) remains intact in the concentrate, and only TAAH is concentrated in the concentrating cells without concentration therein of the photoresist (R), whereby the photoresist concentration of the concentrate is almost the same as that of the starting waste. In this respect, electrodialysis is definitely different from evaporation and reverse osmosis membrane treatment wherein not only TAAH but also the photoresist is concentrated.

The present invention is aimed at regenerating and recovering a high-purity solution of TAAH reutilizable as a photoresist alkali developer. In this respect, it is preferred to obtain a concentrate not substantially containing the photoresist through electrodialysis. For that purpose, it is preferred that pure or ultrapure water or a solution of an electrolyte such as a low-concentration solution of TAAH (e.g., a solution prepared by dissolving a small amount of virgin TAAH in pure or ultrapure water) be passed through the concentrating cells while passing the starting waste through the desalting cells. Where the starting waste is passed through the concentrating cells as well, however, an advantage is gained in respect of a decrease in the amount (volume) of waste water discharged as the desalted solution.

An electrodialysis unit may be one as is generally used. Examples of ion exchange membranes to be used in this unit, though not particularly limited in so far as capable of selectively separating either cations or anions, include ACI-PLEX (registered trademark of products manufactured by Asahi Chemical Industry Co., Ltd.), SELEMION (registered trademark of products manufactured by Asahi Glass Co., Ltd.), and NEOSEPTA (registered trademark of products manufactured by Tokuyama Soda Co., Ltd.). Properties of ion exchange membranes may be typical, which include, for example, a thickness of about 0.1 to 0.6 mm and an electric resistance of about 1 to 10 $\Omega.cm.^2$ The structure of the electrodialysis unit is not particularly limited. For example, a plurality of cation exchange membranes and a plurality of anion exchange membranes may be stacked alternately with each other while maintaining appropriate intervals therebetween with gaskets provided either with an inflow port and an outflow port for a desalting solution, or with an inflow port and an outflow port for a concentrating liquid to form a plurality of cells, which are interposed between a pair of electrodes to construct an electrodialysis unit.

Herein, neutral membranes made of polyvinyl alcohol or the like and having a superior alkali resistance to anion exchange membranes may be used instead of the anion exchange membranes. The neutral membranes, which are simple polymer membranes free of ionic functional groups, allow TAA ions to be passed thereacross, but is lower in permeability thereto than cation exchange membranes. In this case, therefore, a difference in transference number between the neutral membranes and the cation exchange membranes is made the most of, whereby TAA ions can be concentrated by electrodialysis. When the neutral membranes are used instead of the anion exchange membranes, however, the current efficiency becomes worse than that in the case of the anion exchange membranes.

Figure 2:
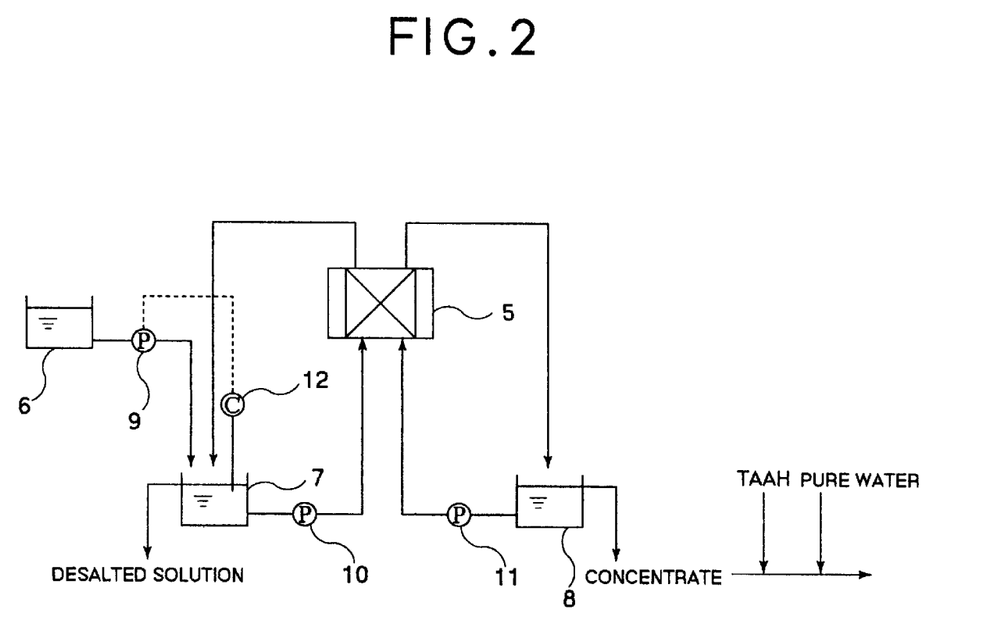
FIG. 2 is a flow diagram illustrating an example of the electrodialysis process carried out according to a circulation method.
Figure 3:
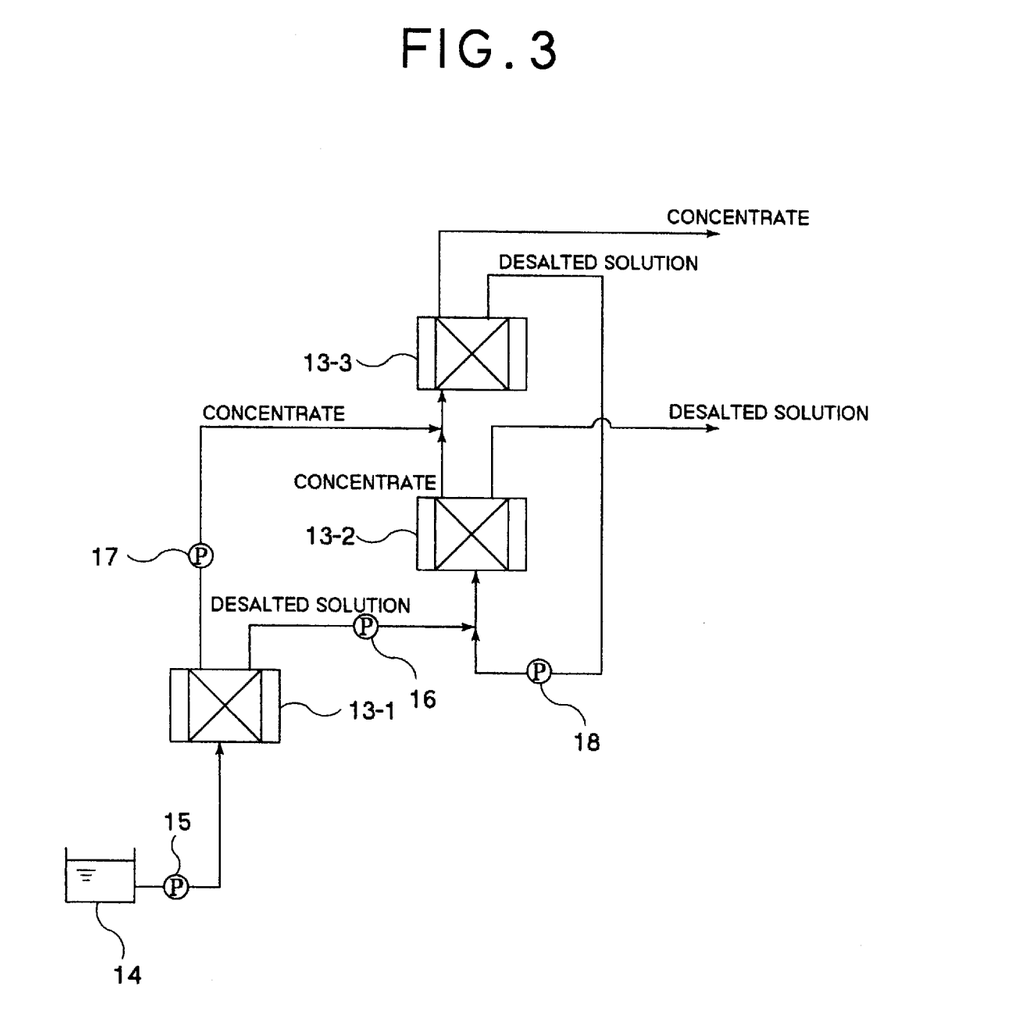
FIG. 3 is a flow diagram illustrating an example of the electrodialysis process carried out according to a multi-stage treatment method.

Examples of electrodialysis processes include a circulation method as shown in FIG. 2 and a multi-stage treatment method as shown in FIG. 3.

According to the circulation method as shown in FIG. 2, the starting waste is sent by means of a pump 9 from a waste tank 6 containing the starting waste containing TAAH and a photoresist to a desalted solution tank 7, from which the starting waste is sent by means of a pump 10 to the desalting cells of an electrodialysis unit 5 to which a DC electric current is applied, while the resulting desalted solution outflowing from the desalting cells is returned back to the desalted solution tank 7 for circulation thereof. On the other hand, a concentrate tank 8 is charged with the starting waste, pure or ultrapure water, or a solution of an electrolyte such as a low-concentration solution of TAAH (e.g., a solution prepared by dissolving a small amount of virgin TAAH in pure or ultrapure water), which is then sent by means of a pump 11 to the concentrating cells of the electrodialysis unit 5, while the concentrate outflowing from the concentrating cells is returned back to the concentrate tank 8 for circulation thereof. The conductivity of the desalted solution in the desalted solution tank 7 is measured with a conductivity meter 12. When the desalted solution in the desalted solution tank 7 is desalted to a given degree of desalting, part of the desalted solution is discharged out of the tank 7 while sending the same amount of the starting waste as that of the discharged desalted solution from the waste tank 6 into the desalted solution tank 7. Herein, the broken line represents control of the pump 9 with a signal from the conductivity meter 12. On the other hand, when the TAAH concentration of the concentrating solution in the concentrate tank 8 reaches a predetermined concentration, the concentrate is withdrawn from the concentrate tank 8. The withdrawn concentrate is then subjected to the step of contact thereof with an ion exchange resin, the step of membrane treatment thereof, reutilization thereof after adjustment of the TAAH concentration [with TAAH or (ultra)pure water], or the like.

According to the multi-stage treatment method as shown in FIG. 3, the starting waste is sent by means of a pump 15 from the waste tank 14 to a first electrodialysis unit 13-1, wherein it is electrodialyzed to obtain a desalted solution, which is then transferred by means of a pump 16 to a second electrodialysis unit 13-2, wherein it is then electrodialyzed to concentrate and recover TAAH remaining in that desalted solution. In a third electrodialysis unit 13-3, the concentrate containing TAAH concentrated by electrodialysis in the second electrodialysis unit 13-2 is electrodialyzed together with the concentrate electrodialyzed with the first electrodialysis unit 13-1 (this latter concentrate being transferred to the third electrodialysis unit 13-3 by means of a pump 17) to concentrate TAAH to a higher concentration. The concentrate obtained by electrodialysis in the third electrodialysis unit 13-3 is then subjected to the step of contact thereof with an ion exchange resin, the step of membrane treatment thereof, reutilization thereof after adjustment of the TAAH concentration [with TAAH or (ultra)pure water], or the like. On the other hand, the desalted solution obtained through treatment with the third electrodialysis unit 13-3 is sent back by means of a pump 18 to the second electrodialysis unit 13-2, wherein it is then electrodialyzed together with the aforementioned desalted solution obtained from the first electrodialysis unit 13-1 to concentrate and recover the remaining TAAH. Since the desalted solution outflowing from the second electrodialysis unit 13-2 contains substantially only the photoresist with a low TAAH concentration, it is discharged out of the system.

Although not shown in FIG. 3, pure or ultrapure water, or a solution of an electrolyte such as a low-concentration solution of TAAH containing no photoresist (e.g., a solution prepared by dissolving a small amount of virgin TAAH in pure or ultrapure water) may be passed through the concentrating cells of the first electrodialysis unit 13-1, whereby a higher-purity concentrate can be obtained. Where the starting waste is passed through the concentrating cells as well in the systems for the two methods as shown in FIGS. 2 and 3, however, an advantage is gained in respect of a decrease in the amount (volume) of waste water discharged as the desalted solution.

The principle of electrolysis that may be effected in the process of the present invention for treatment of a development waste will now be described while referring to FIG. 4. Incidentally, the description will be made of an ordinary case where TAA ions have OH ions as the counter ions thereof to be in the form of TAAH.

Figure 4:
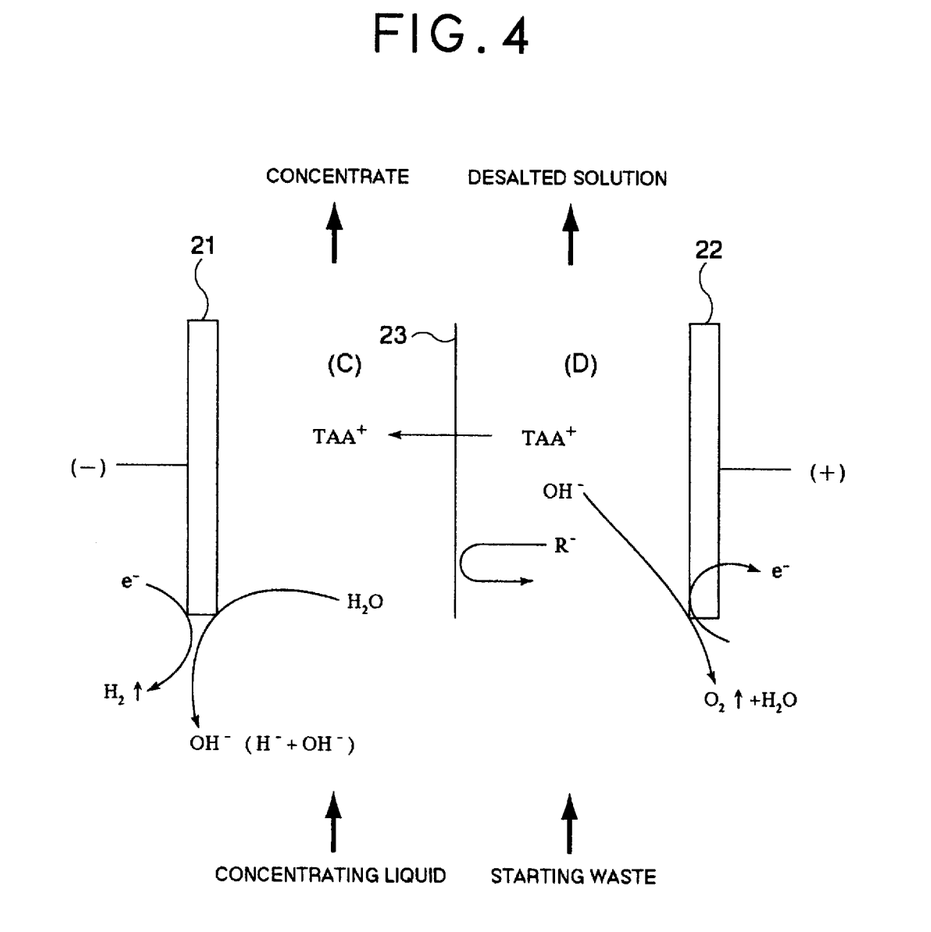
FIG. 4 is an illustration showing the principle of electrolysis when electrolysis is carried out in the process of the present invention.

As shown in FIG. 4, a cation exchange membrane 23 is disposed between a cathode 21 and an anode 22 to form a cathode cell (C) and an anode cell (D). In principle, the cation exchange membrane allows only cations to be passed thereacross [actually, however, a slight amount of anions including a photoresist ($R^-$) and the like is passed thereacross]. A starting waste (development waste or its treated solution obtained through evaporation and/or reverse osmosis membrane treatment and/or ion exchange resin treatment thereof) is passed through the anode cell (D), while pure or ultrapure water or a solution of an electrolyte such as a low-concentration solution of TAAH containing no photoresist (e.g., a solution prepared by dissolving a small amount of virgin TAMH in pure or ultrapure water) is passed as a concentrating liquid through the cathode cell (C). Since TAAH in the starting waste is dissociated into TAA ions ($TAA^+$) and OH ions ($OH^-$), TAA ions as cations are transferred toward the cathode (−) to enter the cathode cell (C) across the cation exchange membrane 23 when a DC electric current is applied between the cathode 21 and the anode 22. On the cathode 21, hydrogen ions ($H^+$) from water ($H_2O \leftarrow \rightarrow H^+ + OH^-$) receive electrons ($e^-$) to generate hydrogen gas ($H_2$), while residual OH ions ($OH^-$) as anions become counter ions of TAA ions entering the cathode cell (C) from the anode cell (D)), whereby TAAH is formed. Thus, TAAH is concentrated in the cathode cell (C) in keeping with progress of electrolysis. In this sense, the cathode cell (C) functions as a concentrating cell. On the other hand, on the anode 22, OH ions ($OH^-$) of TAAH release electrons ($e^-$) to become oxygen gas ($O_2$) and water. In this sense, the anode cell (D) functions as a desalting cell wherein a desalted solution ("dilute solution" depleted of TAA ions) is formed.

Additionally stated, if ionic species such as $Cl^-$ or $Br^-$, which is more liable to undergo electrolysis, is contained in the starting waste, a gas such as $Cl_2$ or $Br_2$ is generated. In this case, further division of the anode cell with an anion exchange membrane with addition of an alkaline substance such as ammonium hydroxide to a sectional cell on the anode's side can prevent generation of a gas such as $Cl_2$ or $Br_2$ through neutralization as disclosed in Japanese Patent Laid-Open No. 155,390/1982. On the other hand, $SO_4^{2-}$ and $NO_3^-$ less easily undergo electrolysis than $OH^-$, so that they remain in the form of $H_2SO_4$, $HNO_3$, etc. with electrolysis of $OH^-$ involving generation of $O_2$.

Two neutral membranes such as hydrophilized porous Teflon membranes may alternatively be used instead of the cation exchange membrane to provide an anode chamber, a middle chamber and a cathode chamber, wherein electrolysis can be effected by passing the starting waste through the middle chamber (Japanese Patent Laid-Open No. 247,641/1985).

When a higher-purity TAAH concentrate is desired to be obtained, a plurality of preferably two) cation exchange membranes may be disposed between the cathode and the anode. In this case, the starting waste is passed through a cell on the anode's side (anode cell), while pure or ultrapure water or a solution of an electrolyte such as a low-concentration solution of TAAH free of the photoresist (e.g., a solution prepared by dissolving a small amount of virgin TAAH in pure or ultrapure water) is passed through a cell on the cathode's side (cathode cell) and the middle cell, whereby TAAH can be refined in multiple stages to obtain a high-purity TAAH concentrate from the cathode cell.

Substantially the same constitutions as used in the electrodialysis systems of FIGS. 2 and 3 can be applied to electrolysis as well.

Additionally stated, the terms "concentrate" and "desalted solution" used herein are used to indicate whether the TAAH content is increased or decreased, and not to indicate which is higher or lower in TAAH concentration.

EXAMPLES

The following Examples will illustrate the present invention in detail, but should not be construed as limiting the scope of the present invention.

Example 1

Use was made of a photoresist development waste containing a photoresist and tetramethylammonium hydroxide (TMAH) and discharged from a liquid crystal display production process. As to water quality, this waste had a TMAH concentration of 15,000 ppm, a photoresist-derived TOC concentration of 280 ppm, a pH value of 12.8, and a sodium concentration of 130 ppb. Additionally stated, the TMAH concentration was analyzed according to ion-exchange chromatography, the photoresist concentration was measured according to absorption spectrophotometry, and the sodium concentration was measured according to atomic absorption spectrometry.

The development waste was collected as a liquid sample, from which TMAH was then separated, concentrated and recovered into ultrapure water with an electrodialysis unit. MICRO ACILYZER G3 (registered trademark of a product manufactured by Asahi Chemical Industry Co., Ltd.) was used as the electrodialysis unit, wherein use was made of cation exchange membranes ACIPLEX K-501 (registered trademark of a product manufactured by Asahi Chemical Industry Co., Ltd.) and anion exchange membranes ACIPLEX A-201 (registered trademark of a product manufactured by Asahi Chemical Industry Co., Ltd.). Herein, other ion exchange membranes may alternatively be used, while neutral membranes such as ACIPLEX PVA #100 (registered trademark of a product manufactured by Asahi Chemical Industry Co., Ltd.) may be used instead of the anion exchange membranes.

Electrodialysis was carried out at a voltage of 12 V until the TMAH concentration of the recovered solution reached 30,000 ppm (30 g/liter). The resultant recovered solution had a photoresist-derived TOC concentration of 12 ppm, a pH value of 13.4 and a sodium concentration of 290 ppb.

Subsequently, there was prepared a column packed with a strongly basic anion exchange resin AMBERLITE IRA-402BL (registered trademark of a product manufactured by Rohm and Haas Company) in the OH form, through which the above-mentioned recovered solution was passed. The resultant treated solution had a TMAH concentration of 30,000 ppm, a photoresist-derived TOC concentration of at most 0.1 ppm, a pH value of 13.5 and a sodium concentration of 300 ppb.

There was further prepared a column packed with a strongly acidic cation exchange resin AMBERLITE 200C (registered trademark of a product manufactured by Rohm and Haas Company) preliminarily converted into the tetramethylammonium form (TMA form), through which the above-mentioned treated solution was passed. The resultant treated solution had a TMAH concentration of 30,000 ppm, a photoresist-derived TOC concentration of at most 0.1 ppm, a pH value of 13.5 and a sodium concentration of at most 10 ppb.

Example 2

Substantially the same procedure of treating each of the following liquid samples as in Example 1 was repeated except that electrodialysis was carried out at a TMAH recovery of 80% till a TMAH concentration of recovered solution of 2.4 wt. % while using a mixed bed column packed with a strongly basic anion exchange resin AMBERLITE IRA-900 (registered trademark of a product manufactured by Rohm and Haas Company) and a strongly acidic cation exchange resin AMBERLITE 200C (registered trademark of a product manufactured by Rohm and Haas Company).

<Liquid Samples>

Figure 5:
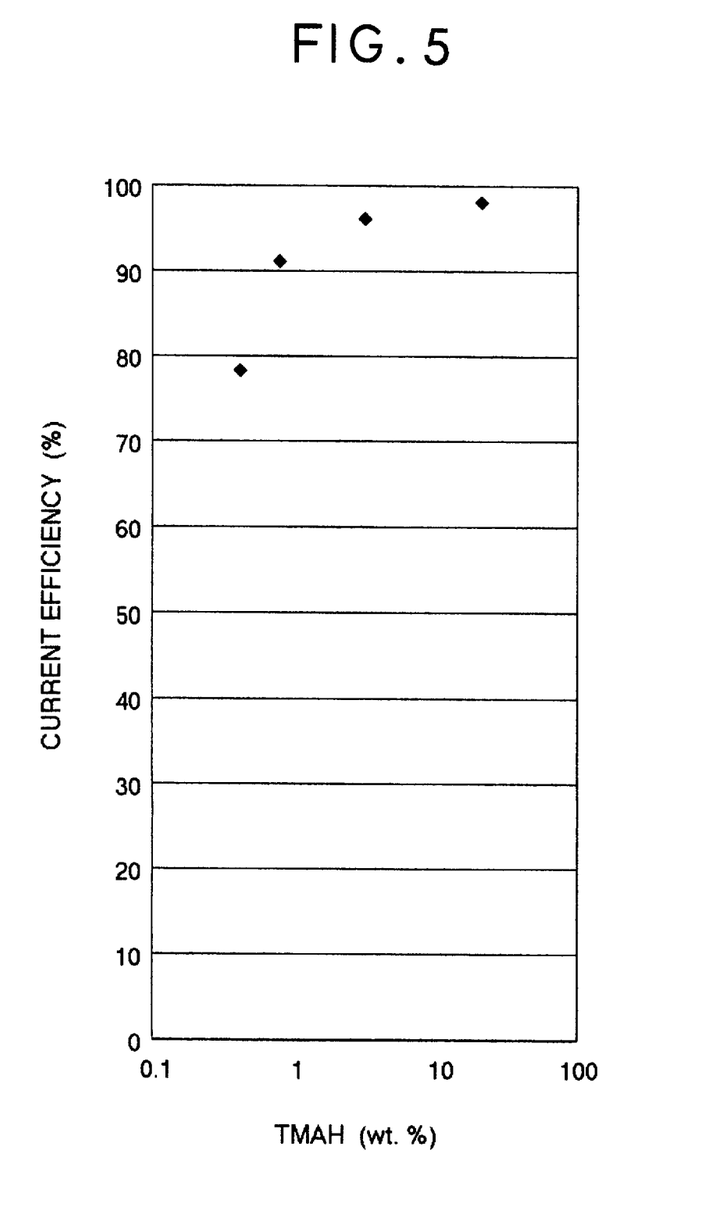
FIG. 5 is a graph diagram showing the relationship between the initial tetraalkylammonium hydroxide concentration of solution to be treated in electrodialysis and the current efficiency, wherein the abscissa is represented on a logarithmic scale.

(1) Liquid Sample 1: development waste from Company A (2) Liquid Sample 2: concentrate (bottoms) obtained by evaporation of development waste from Company A (3) Liquid Sample 3: development waste from Company B (4) Liquid Sample 4: concentrate obtained by reverse osmosis membrane treatment of development waste from Company B The current efficiencies during electrodialysis of these liquid samples are shown in Table 1. FIG. 5 is a graph diagram showing the initial TMAH concentration versus current efficiency relationship, wherein data in Table 1 are plotted.

TABLE 1

| Liquid Sample | TMAH (wt. %) | Current Efficiency (%) |
| --- | --- | --- |
| Liquid Sample 1 | 0.4 | 78 |
| Liquid Sample 2 | 29 | 98 |
| Liquid Sample 3 | 0.8 | 91 |
| Liquid Sample 4 | 2.5 | 96 |

The TMAH concentrations, photoresist-derived TOC concentrations and sodium concentrations of these liquid samples are shown together with the TMAH concentrations, photoresist-derived TOC concentrations and sodium concentrations of the concentrates (recovered solutions) thereof obtained by electrodialysis and the treated solutions (refined solutions) thereof obtained by subsequent ion exchange treatment in FIG. 2, wherein "Photoresist" indicates the photoresist-derived TOC concentration.

TABLE 2

|  | TMAH (wt. %) | Photoresist (ppm) | Sodium (ppb) |
| --- | --- | --- | --- |
| Liquid Sample 1 | 0.4 | 40 | 20 |
| Recovered Solution | 2.4 | 10 | 180 |
| Refined Solution | 2.4 | 0.1 | <10 |
| Liquid Sample 2 | 29 | 3000 | 1600 |
| Recovered Solution | 2.4 | 8 | 420 |
| Refined Solution | 2.4 | 0.1 | <10 |
| Liquid Sample 3 | 0.8 | 170 | 50 |
| Recovered Solution | 2.4 | 13 | 210 |
| Refined Solution | 2.4 | 0.1 | <10 |
| Liquid Sample 4 | 2.5 | 580 | 150 |
| Recovered Solution | 2.4 | 10 | 220 |
| Refined Solution | 2.4 | 0.1 | <10 |

In comparison of Liquid Sample 1 with Liquid Sample 2 (concentrate through evaporation), Liquid Sample 2 is better in current efficiency during electrodialysis, higher in the rate of electrodialysis treatment, and higher in recovered solution/liquid sample volume ratio while involving no difference in impurity concentrations between the refined solution of Liquid Sample 1 and the refined solution of Liquid Sample 2. In comparison of Liquid Sample 3 with Liquid Sample 4 (concentrate through reverse osmosis membrane treatment) as well, Liquid Sample 3 is better in current efficiency during electrodialysis, higher in the rate of electrodialysis treatment, and higher in recovered solution/liquid sample volume ratio while involving no difference in impurity concentrations between the refined solution of Liquid Sample 3 and the refined solution of Liquid Sample 4.

Thus, when a concentrate obtained by evaporation or reverse osmosis membrane treatment of a development waste is subjected to electrodialysis, the resultant recovered solution has much the same concentrations of impurities as those in the recovered solution obtained by direct electrodialysis of the development waste as such. Hence, there is no significant difference in the ion exchange treatment cost between these two kinds of recovered solutions. Electrodialysis of the concentrate obtained through evaporation or reverse osmosis is greatly low in electrodialysis treatment cost as compared with direct electrodialysis of the development waste.

Further, since the TMAH concentration of the desalted solution of Liquid Sample 1 at a TMAH recovery of 80% is 0.08 wt. % whereas the TMAH concentration of the desalted solution of Liquid Sample 2 at a TMAH recovery of 80% is 5.8 wt. %, the desalted solution of Liquid Sample 2 can be further electrodialyzed to heighten the TMAH recovery to at least 95%, in which case the TMAH concentration of the desalted solution becomes at most 1.45%. On the other hand, a TMAH recovery of 95% cannot substantially be secured from Liquid Sample 1 (this is so because the TMAH concentration of the desalted solution is calculated to be 0.02 wt. % at a TMAH recovery of 95% in this case, and migration of ions is therefore extremely slowed down at low TMAH concentrations close to that value).

Where TMAH is separated, concentrated and recovered into ultrapure water by electrodialysis as in this Example, the desalted solution is generated in substantially the same amount as that of the liquid sample. When concentration by evaporation and/or reverse osmosis membrane treatment is done as a pretreatment, the amount of the desalted solution is naturally decreased, whereby the disposal cost involved in the off-site disposal, biodegradation treatment or the like of the desalted solution can be reduced.

The desalted solution may be concentrated again and again by evaporation or reverse osmosis membrane treatment to subject the resultant concentrate to treatments such as electrodialysis, etc. When impurities such as the photoresist are concentrated to a high concentration in this case, however, it is conceivable that troubles (deposition of the photoresist, deterioration of the water quality of the concentrate through electrodialysis, etc.) arise in operations such as electrodialysis. Thus, the method of disposing the desalted solution (retreatment, off-site disposal, or the like) may be determined while having regard to the impurity concentration thereof and the like.

In any event, incorporation of the step of concentration by evaporation and/or reverse osmosis membrane treatment can reduce the total treatment cost.

According to the process of the present invention for rejuvenation treatment of a photoresist development waste, a tetraalkylammonium ion-containing photoresist development waste further containing at least a photoresist is subjected to the step of electrodialysis and/or electrolysis, and the step of contact with an ion exchange resin or resins (preferably an anion exchange resin and a cation exchange resin in at least one of the H form and the TAA form), whereby impurities such as the photoresist, ionic impurities and other impurities can be sufficiently removed to obtain a high-purity solution containing a tetraalkylammonium hydroxide as a reutilizable photoresist alkali developer.

When the step of evaporation and/or reverse osmosis membrane treatment is taken at least before the step of electrodialysis and/or electrolysis, there can be secured advantages such as an improvement in current efficiency during electrodialysis and/or electrolysis, miniaturization and running cost reduction of an electrodialysis unit and/or an electrolysis unit, a decrease in voltage applied to such a unit, and an improvement in the recovery of tetraalkylammonium ions, whereby the total treatment cost can be reduced.

The entire disclosure of Japanese Patent Application No. 8-324867 filed on Nov. 21, 1996 including specification, claims, drawings and summary are incorporated herein by reference in its entirety.

What is claimed is:

1. A process for rejuvenation treatment of a photoresist development waste mainly containing a photoresist and tetraalkylammonium ions for regeneration and recovery of a high-purity solution of a tetraalkylammonium hydroxide reutilizable as a photoresist developer from the photoresist development waste, comprising at least the step of concentration of tetraalkylammonium ions by at least one of electrodialysis and electrolysis, and the step of removal of impurities by adsorption thereof on an ion exchange resin through contact therebetween.

2. A process for rejuvenation treatment of a photoresist development waste as claimed in claim 1, wherein said ion exchange resin is at least one of an anion exchange resin and a cation exchange resin in at least one of the hydrogen ion form (H form) and the tetraalkylammonium ion form (TAA form).

3. A process for rejuvenation treatment of a photoresist development waste as claimed in claim 1, which comprises the step of subjecting a photoresist development waste mainly containing a photoresist and tetraalkylammonium ions to at least one of electrodialysis and electrolysis; and the step of bringing the concentrate obtained through the above-mentioned step and mainly containing tetraalkylammonium ions into contact with an anion exchange resin and a cation exchange resin in at least one of the H form and the TAA form as said ion exchange resin to adsorb impurities on said ion exchange resin for removal of the impurities.

4. A process for rejuvenation treatment of a photoresist development waste as claimed in claim 1, which comprises the step of bringing a photoresist development waste mainly containing a photoresist and tetraalkylammonium ions into contact with an anion exchange resin and a cation exchange resin in at least one of the H form and the TAA form as said ion exchange resin to adsorb impurities on said ion exchange resin for removal of the impurities; and the step of subjecting the treated solution obtained through the above-mentioned step to at least one of electrodialysis and electrolysis to concentrate tetraalkylammonium ions and separate the resultant concentrate.

5. A process for rejuvenation treatment of a photoresist development waste as claimed in claim 1, which comprises the step of bringing a photoresist development waste mainly containing a photoresist and tetraalkylammonium ions into contact with an anion exchange resin as part of said ion exchange resin to mainly adsorb the photoresist as an impurity on said anion exchange resin for removal thereof, the step of subjecting the treated solution obtained through the above-mentioned step to at least one of electrodialysis and electrolysis to concentrate tetraalkylammonium ions and separate the resulting concentrate; and the step of bringing the concentrate obtained through the above-mentioned two steps and mainly containing tetraalkylammonium ions into contact with a cation exchange resin in at least one of the H form and the TAA form as other part of said ion exchange resin to further adsorb impurities on said cation exchange resin for removal of the impurities.

6. A process for rejuvenation treatment of a photoresist development waste as claimed in claim 1, which comprises the step of neutralizing a photoresist development waste mainly containing a photoresist and tetraalkylammonium ions, and separating and removing therefrom the insolubilized photoresist; the step of subjecting the neutralized and solid-removed solution obtained through the above-mentioned step to electrodialysis and electrolysis, or electrolysis to concentrate tetraalkylammonium ions and separate the resultant concentrate; and the step of bringing the concentrate obtained through the above-mentioned two steps and mainly containing tetraalkylammonium ions into contact with an anion exchange resin and a cation exchange resin in at least one of the H form and the TAA form as said ion exchange resin to adsorb impurities on said ion exchange resin for removal of the impurities.

7. A process for rejuvenation treatment of a photoresist development waste as claimed in claim 1, which comprises the step of neutralizing a photoresist development waste mainly containing a photoresist and tetraalkylammonium ions, and separating and removing therefrom the insolubilized photoresist; the step of bringing the neutralized and solid-removed solution obtained through the above-mentioned step into contact with an anion exchange resin and a cation exchange resin in at least one of the H form and the TAA form as said ion exchange resin to adsorb impurities on said ion exchange resin for removal thereof; and the step of subjecting the treated solution obtained through the above-mentioned two steps to electrodialysis and electrolysis, or electrolysis to concentrate tetraalkylammonium ions and separate the resulting concentrate.

8. A process for rejuvenation treatment of a photoresist development waste as claimed in claim 1, which comprises the step of neutralizing a photoresist development waste mainly containing a photoresist and tetraalkylammonium ions, and separating and removing therefrom the insolubilized photoresist; the step of bringing the neutralized and solid-removed solution obtained through the above-mentioned step into contact with an anion exchange resin as part of said ion exchange resin to mainly adsorb the residual photoresist as an impurity on said anion exchange resin for removal thereof; the step of subjecting the treated solution obtained through the above-mentioned two steps to electrodialysis and electrolysis, or electrolysis to concentrate tetraalkylammonium ions and separate the resulting concentrate; and the step of bringing the treated solution obtained through the above-mentioned three steps and mainly containing tetraalkylammonium ions into contact with a cation exchange resin in at least one of the H form and the TAA form as other part of said ion exchange resin to further adsorb impurities on said cation exchange resin for removal of the impurities.

9. A process for rejuvenation treatment of a photoresist development waste as claimed in claim 1, which further comprises the step of concentrating said photoresist development waste, the treated solution thereof or the neutralized and solid-removed solution thereof by at least one of evaporation and reverse osmosis membrane treatment at least before the step of said at least one of electrodialysis and electrolysis.

10. A process for rejuvenation treatment of a photoresist development waste as claimed in claim 1, wherein said ion exchange resin is used in the form of a mixed ion exchange resin of an anion exchange resin and a cation exchange resin in at least one of the H form and the TAA form.

11. A process for rejuvenation treatment of a photoresist development waste as claimed in claim 1, wherein said ion exchange resin is used in the form of a stratified ion exchange resin wherein an anion exchange resin is disposed on the upstream side of a cation exchange resin in at least one of the H form and the TAA form disposed on the downstream side.

12. A process for rejuvenation treatment of a photoresist development waste as claimed in claim 1, wherein said ion exchange resin is used in such a way that a layer of an anion exchange resin in a column or a tower is disposed on the upstream side of a layer of a cation exchange resin in at least one of the H form or the TAA form in a column or a tower.

13. A process for rejuvenation treatment of a photoresist development waste as claimed in claim 2, wherein said anion exchange resin is a strongly basic anion exchange resin in the hydroxide ion form (OH form).

14. A process for rejuvenation treatment of a photoresist development waste as claimed in claim 2, wherein said cation exchange resin is a cation exchange resin in the TAA form.

15. A process for rejuvenation treatment of a photoresist development waste as claimed in claim 1, wherein said at least one of electrodialysis and electrolysis is effected according to a circulation method or a multi-stage treatment method.

16. A process for rejuvenation treatment of a photoresist development waste as claimed in claim 1, wherein a membrane treatment unit for removal of fine particles from a high-purity solution of the tetraalkylammonium hydroxide is disposed at or near the terminal of the system involved in the process.

\* \* \* \* \*